(12) United States Patent
Noel et al.

(10) Patent No.: US 10,693,844 B2
(45) Date of Patent: *Jun. 23, 2020

(54) EFFICIENT MIGRATION FOR ENCRYPTED VIRTUAL MACHINES BY ACTIVE PAGE COPYING

(71) Applicant: Red Hat, Inc., Raleigh, NC (US)

(72) Inventors: Karen Noel, Westford, MA (US); Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 66 days.

This patent is subject to a terminal disclaimer.

(21) Appl. No.: 15/686,106

(22) Filed: Aug. 24, 2017

(65) Prior Publication Data

US 2019/0068557 A1 Feb. 28, 2019

(51) Int. Cl.
*H04L 29/06* (2006.01)
*G06F 21/53* (2013.01)
(Continued)

(52) U.S. Cl.
CPC .......... *H04L 63/0428* (2013.01); *G06F 3/067* (2013.01); *G06F 3/0623* (2013.01);
(Continued)

(58) Field of Classification Search
CPC ..... H04L 63/0428; H04L 9/0861; H04L 9/14; G06F 21/602; G06F 3/0623; G06F 9/45558
See application file for complete search history.

(56) References Cited

U.S. PATENT DOCUMENTS

| 6,789,156 | B1 * | 9/2004 | Waldspurger | ....... | G06F 12/1018 |
| | | | | | 711/6 |
| 7,484,208 | B1 * | 1/2009 | Nelson | ................ | G06F 9/45558 |
| | | | | | 718/1 |

(Continued)

OTHER PUBLICATIONS

Aslam et al., "Security and Trust Preserving VM Migrations in Public Clouds," 2012 IEEE 11th International Conference on Trust, Security and Privacy in Computing and Communications Year: 2012 | Conference Paper | Publisher: IEEE.*
(Continued)

*Primary Examiner* — Roderick Tolentino
(74) *Attorney, Agent, or Firm* — Lowenstein Sandler LLP

(57) ABSTRACT

Systems and methods for efficient migration for encrypted virtual machines (VMs) by active page copying are disclosed. An example method may include receiving a request to migrate a VM, identifying a first page of memory of the VM on the source host machine for migration, the first page of memory encrypted with a VM-specific encryption key, protecting the first page from access by the VM, executing a send command to modify the first page from encrypted with the guest-specific encryption key to encrypted with a migration key while the first page remains in place in the memory, allocating a second page in a buffer, copying contents of the first page to the second page, executing a receive command to modify the first page from encrypted with the migration key to encrypted with the guest-specific encryption key while the first page remains in place in the memory, and transmitting contents of the second page.

19 Claims, 9 Drawing Sheets

(51) Int. Cl.
*G06F 21/60* (2013.01)
*G06F 3/06* (2006.01)
*H04L 9/14* (2006.01)
*G06F 9/455* (2018.01)
*H04L 9/08* (2006.01)

(52) U.S. Cl.
CPC ........ *G06F 3/0647* (2013.01); *G06F 9/45558* (2013.01); *G06F 21/53* (2013.01); *G06F 21/602* (2013.01); *H04L 9/0861* (2013.01); *H04L 9/0866* (2013.01); *H04L 9/0894* (2013.01); *H04L 9/14* (2013.01); *G06F 9/45554* (2013.01); *G06F 2009/4557* (2013.01); *G06F 2009/45583* (2013.01); *G06F 2009/45587* (2013.01); *G06F 2221/2107* (2013.01)

(56) References Cited

U.S. PATENT DOCUMENTS

| | | | |
|---|---|---|---|
| 2009/0132804 A1 | 5/2009 | Paul et al. | |
| 2009/0276771 A1* | 11/2009 | Nickolov | G06F 9/4856 717/177 |
| 2011/0010515 A1* | 1/2011 | Ranade | G06F 11/1451 711/162 |
| 2011/0302577 A1* | 12/2011 | Reuther | G06F 9/45558 718/1 |
| 2015/0149999 A1* | 5/2015 | Ramanathan | G06F 9/4856 718/1 |
| 2015/0241259 A1 | 8/2015 | Tsai et al. | |
| 2015/0242159 A1 | 8/2015 | Tsirkin | |
| 2015/0318986 A1* | 11/2015 | Novak | H04L 63/0428 713/189 |
| 2015/0381589 A1 | 12/2015 | Tarasuk-Levin et al. | |
| 2016/0132443 A1* | 5/2016 | Davda | G06F 13/28 710/308 |
| 2017/0277898 A1* | 9/2017 | Powell | G06F 21/602 |
| 2018/0107605 A1* | 4/2018 | Dong | G06F 12/16 |
| 2018/0183580 A1* | 6/2018 | Scarlata | G06F 21/602 |

OTHER PUBLICATIONS

Osanaiye et al., "From Cloud to Fog Computing: A Review and a Conceptual Live VM Migration Framework," IEEE Access Year: 2017 | vol. 5 | Journal Article | Publisher: IEEE.*

* cited by examiner

EFFICIENT MIGRATION FOR ENCRYPTED VIRTUAL MACHINES BY ACTIVE PAGE COPYING

TECHNICAL FIELD

The disclosure is generally related to virtualization systems, and is more specifically related to efficient migration for encrypted virtual machines by active page copying.

BACKGROUND

Virtualization is a computing technique that improves system utilization, decoupling applications from the underlying hardware, and enhancing workload mobility and protection. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, and so on.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
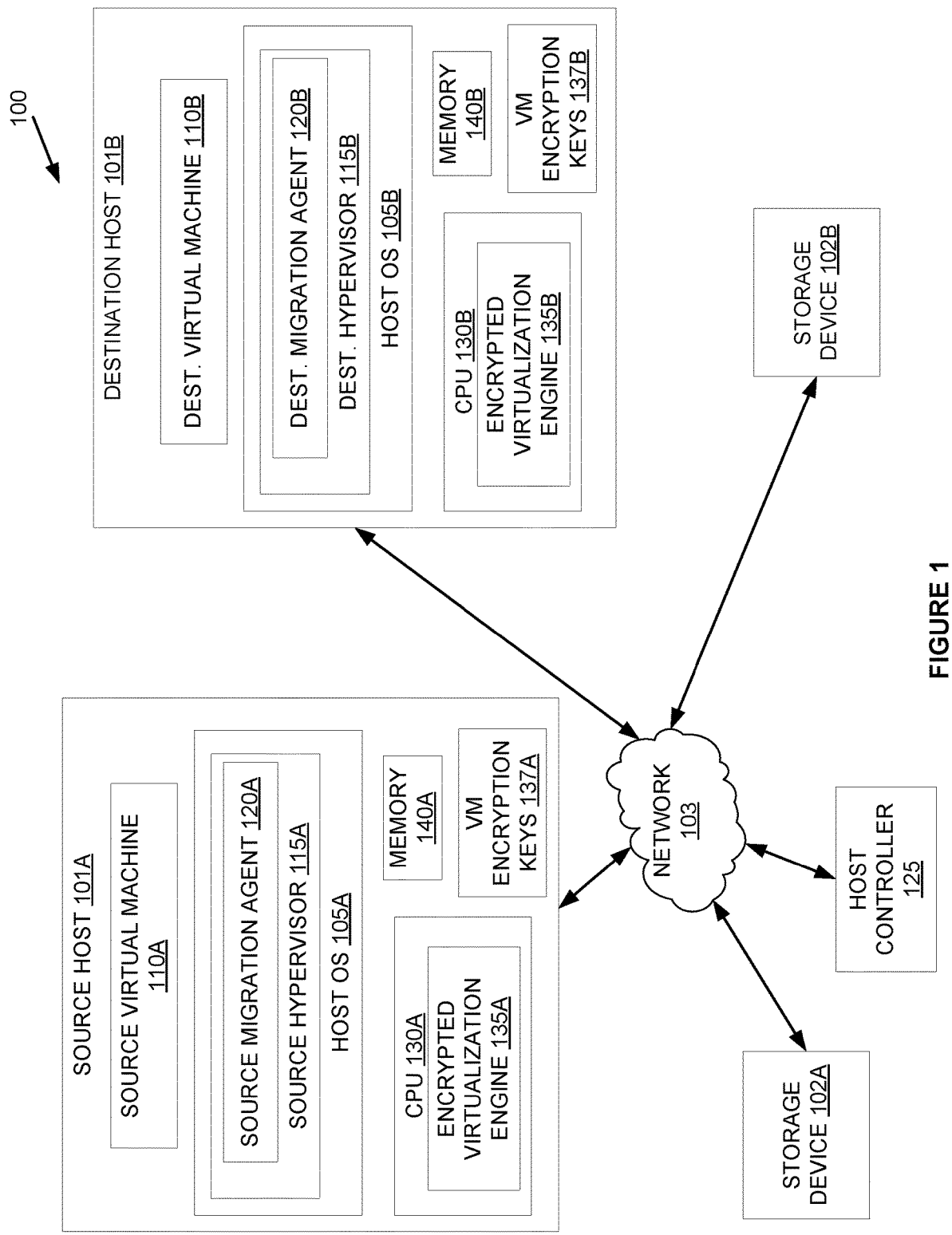
FIG. 1 depicts a high-level diagram of an example distributed computing system in accordance with one or more aspects of the disclosure.

Described herein are methods and systems for efficient migration for encrypted virtual machines (VMs) by active page copying. Encrypted virtualization provides a security paradigm that protects VMs from physical threats, as well as other VMs and the hypervisor. In one implementation, encrypted VMs may be provided using a Secure Encrypted Virtualization (SEV) feature set. When encrypted virtualization is enabled, an encryption engine (e.g., firmware, circuitry of a processing device, etc.) of a host machine hosting the VM can tag all code and data with a VM identifier (ID) that indicates which VM that data originated from or is intended for. This tag is kept with the data at all times and prevents that data from being used by anyone other than the owner. Private memory of a VM is encrypted with a VM-specific key that is generated and maintained by the encryption engine (and which only the encryption engine knows), where the VM-specific key is associated with the VM ID of the VM. The encryption engine provides strong cryptographic isolation between VMs, as well as between the VMs and the hypervisor.

However, a limitation of conventional encrypted virtualization is lack of support for live migration. VM migration refers to the process of stopping execution of a VM at a first computing device (e.g., source host machine), transferring the state of the VM to a second computing device (e.g., destination host machine), and resuming execution of the VM at the second computing device. Live VM migration (also referred to as live migration) is a migration of a VM that occurs with minimal to no downtime (i.e., execution within the VM seemingly does not stop; VM continues to serve clients) of the VM.

Conventionally, when an encrypted VM is migrated, the source host machine executes a command to decrypt each page of the VM (using the guest-specific key of the encryption engine) and re-encrypt each page with a migration key (e.g., using a cryptographic context that is established with the destination host machine). However, as VM accesses can only be decrypted with the guest-specific key of the encryption engine, this means that the VM is not able to access those pages of the VM that have been re-encrypted with the migration key during migration. This results in degraded performance of the host machine due to increased downtime of the VM from the inability to access memory pages of the VM during migration.

Implementations of the disclosure optimize the inefficiencies of live migration of encrypted VMs by utilizing active page copying for encrypted VMs. Implementations of the disclosure provide efficient migration for encrypted VMs by active page copying. To provide the active page copying for encrypted VMs during migration, the hypervisor is modified to create two copies of a VM memory page that is being migrated, where the first copy is used for access by the VM on the source host machine during the migration process and the second copy is used for sending to the destination host machine.

Implementations of the disclosure provide a technical improvement over the conventional systems by providing a properly-encrypted VM memory page for migration at the same time as providing an encrypted version of the same VM memory page that is accessible by the source VM during the migration process. As a result, less downtime is experienced during the migration, resulting in a more efficient migration process and an improved virtualization end user experience.

FIG. 1 illustrates a virtualization system 100 in which embodiments may operate. It should be noted that other architectures for virtualization system 100 (also referred to herein as system 100) are possible, and that the implementation of a virtualization system utilizing embodiments of the disclosure are not necessarily limited to the specific architecture depicted by FIG. 1. Terms such as "machine," "device," "computer," "computer device," and "computing system" may be used interchangeably and synonymously throughout this document.

The virtualization system 100 may include a source host computer system 101a (the "source host 101a"), a destination host computer system 101b (the "destination host 101b"), one or more storage devices 102 (e.g., 102a, 102b), and a host controller 125, which may all be communicably connected over a network 103. Each of host machines 101a and 101b may be computing devices (such as a rackmount server, a router computer, a server computer, a personal computer, a mainframe computer, a laptop computer, a tablet computer, a desktop computer, etc.), data stores (e.g., hard disks, memories, databases, non-volatile dual in-line memory module (NVDIMM) device, etc.), networks, software components, and/or hardware components that may be used to enable disabling in-memory caching of a VM during migration. The network 103 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some implementations, host machines 101a and 101b may belong to a cluster comprising additional computer systems not depicted in FIG. 1, while in some other implementations, host machines 101a and 101b may be independent systems that are capable of communicating via network 103.

The source host 101a and the destination host 101b can include hardware components, such as one or more physical central processing units (CPUs) 130a-130b, memory 140a-140b, and other hardware components. One or more processors may be embodied as CPU 130a-130b, which can be a micro-processor, digital signal processor (DSP), or other processing component. CPU 130a-130b may process various received data and may carry out the code or instructions or one or more computer programs, for example, to provide input/output operations specified by the instructions.

Memory 140a-140b may include volatile memory devices (e.g., random access memory (RAM)), non-volatile memory devices (e.g., flash memory), and/or other types of memory devices), and a storage device (e.g., a magnetic hard disk, a Universal Serial Bus [USB] solid state drive, a Redundant Array of Independent Disks [RAID] system, a network attached storage [NAS] array, etc.). It should be noted that the fact that a single CPU 130a, 130b is depicted in FIG. 1 for each of host machines 101a and 101b is merely illustrative, and that in some other examples one or both of host machines 101a and 101b may comprise a plurality of CPUs. Similarly, in some other examples one or both of host machines 101a and 101b may comprise a plurality of storage devices, rather than a single storage device.

A source host 101a can include one or more VMs 110a and can execute an operating system 105a ("host OS") to manage its resources. A VM 110a can execute a guest OS (not shown). In one embodiment, the source host 101a executes a source hypervisor 115a to virtualize access to underlying source host hardware, making the use of the source VM 110a transparent to the guest OS running on VM 110a and users (e.g., a system administrator) of the source host 101a. In one implementation, the source hypervisor 115a is a Red Hat™ Enterprise Virtualization (RHEV) Hypervisor. In some implementations, the source hypervisor is a VMWare™ vSphere™ Hypervisor.

The CPU 130a, 130b may include an encrypted virtualization engine 135a, 135 that provides a security paradigm that encrypts VMs 110a, 110b to protect the VMs 110a, 110b from physical threats, as well as from other VMs 110a, 110b and the hypervisor 115a, 115b. In one implementation, the encrypted virtualization engine 135a, 135b is implemented as hardware circuitry of the CPU 130a, 130b. In some implementations, encrypted virtualization engine 135a, 135b is provided as firmware installed on the host machine 101a, 101b. The encrypted virtualization engine 135a, 135b may implement a Secure Encrypted Virtualization (SEV) feature set.

When encrypted virtualization is enabled, the encryption engine 135a, 135b can tag all code and data with a VM identifier (ID) that indicates which VM 110a, 110b that the data originated from or is intended for. This tag is kept with the data and prevents that data from being used by anyone other than the owner. Private memory of a VM 110a, 110b is encrypted with a VM-specific key 137a, 137b generated and maintained by the encryption engine 135a, 135b, where the VM-specific key 137a, 137b is associated with the VM ID of the VM 110a, 110b. The encryption engine 135a, 135b provides cryptographic isolation between VMs, as well as between the VMs and the hypervisor.

In one implementation, virtualization system 100 of FIG. 1 may perform a migration process, where the source VM 110a is migrated from the source host 101a to the destination host 101b using at least one storage device 102 (storage devices 102a, 102b). The destination host 110b can include one or more VMs 110b executing under the control of a corresponding destination hypervisor 115b. Storage device 102 can be accessible by the source host 101a and by the destination host 101b. The storage device 102 can be networked storage (e.g., network attached storage (NAS), storage area network (SAN). The storage device 102 can be located with the source host 101a, within the same network as the source host 101a, with the destination host 102b, within the same network as the destination host 102b, or with a third location, to name a few examples.

In one embodiment, the source hypervisor 115a may include a source migration agent 120a and the destination hypervisor 115b may include a corresponding destination migration agent 120b. The migration agent 120a, 120b can receive migration instructions from the host controller 125. The host controller 125 may reside on a designated computer system (e.g., a server computer, a desktop computer, etc.) or be part of the host machine 101a, 101b or another machine. Host controller 125 can manage VM migration by issuing instructions to hypervisor 115a, 115b. The host controller 125 can issue the migration instructions after a triggering event (e.g., a system administrator's migration request, system conditions, such as resource utilization by source host exceeding a threshold). The host controller 125 and migration agents 120 can work together to manage migrations, including determining a destination host machine 101b, coordinating one or more storage devices 102, scheduling migration, etc. Although shown as discrete components of the hypervisors 115a-115b, the migration agents 120a, 120b may be separate components coupled to hypervisors 115a-115b.

As previously discussed, a limitation of conventional encrypted virtualization is lack of support for live migration. Conventionally, when an encrypted VM is migrated, the source host executes a command to decrypt each page of the VM (using the guest-specific key of the encryption engine) and re-encrypt each page with a migration key (e.g., using a cryptographic context that is established with the destination host machine). However, as VM accesses can only be decrypted with the guest-specific key of the encryption engine, this means that the VM is not able to access those pages of the VM that have been re-encrypted with the migration key during migration.

In accordance with one example, migration agent 120a, 120b is capable of implementing efficient migration for encrypted VMs by active page copying. To provide the active page copying for encrypted VMs during migration, the hypervisor (e.g., source hypervisor 115a) is modified to create two copies of a VM memory page that is being migrated, where the first copy is used for access by the VM on the source host machine during the migration process and the second copy is used to send to the destination host machine 101b. Aspects of the migration using active page copying of implementations of the disclosure are described in more detail with respect to FIGS. 2A and 2B.

Figure 2A:
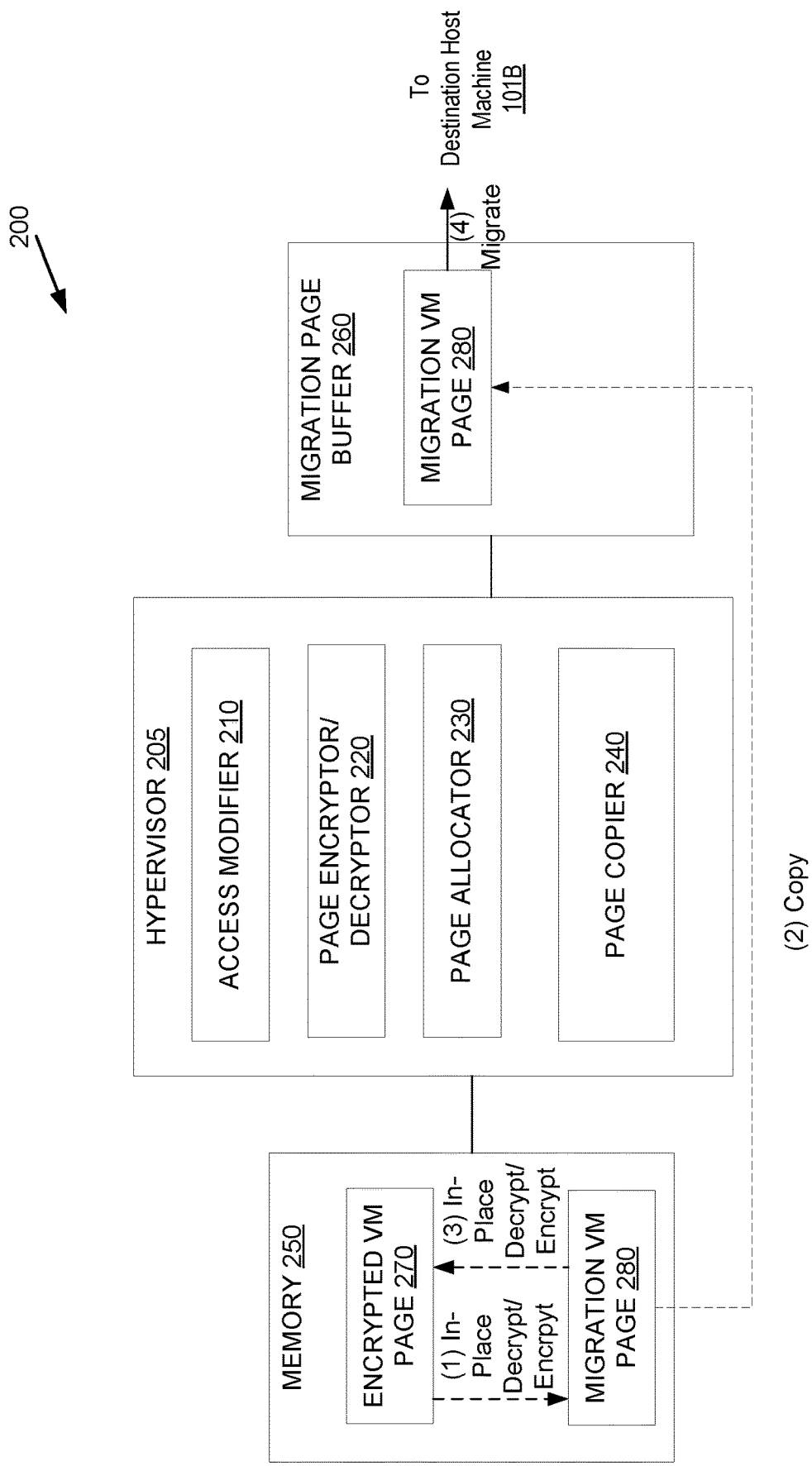
FIG. 2A schematically illustrates an example apparatus in which implementations of the disclosure may operate.

FIG. 2A is a block diagram of a source host machine 200 to provide active page copying for encrypted VMs during migration, in accordance with an implementation of the disclosure. Source host machine 200 may include a hypervisor 205, a memory 250, and a migration page buffer 260. In one implementation, hypervisor 205 may be the same as source hypervisor 115a and memory 250 may be the same as memory 140a, as described with respect to FIG. 1. In one implementation, migration page buffer 260 may be implemented in memory 140a or CPU 130a described with respect to FIG. 1. More or less components than illustrated as part of hypervisor 205 in FIG. 2A may be implemented in migration agent 200, and implementations of the disclosure are not limited to those specifically described and illustrated herein.

In one implementation, hypervisor 205 may include an access modifier 210, a page encryptor/decryptor 220, a page allocator 230, and a page copier 240. In some implementations, a migration agent, such as migration agent 120a of hypervisor 110a in FIG. 1, may include the access modifier 210, a page encryptor/decryptor 220, a page allocator 230, and a page copier 240.

Hypervisor 205 may perform a migration process using active page copying for an encrypted VM. When an encrypted VM page 270 in memory 250 is identified for migration from the source host machine 200, the hypervisor 205 may execute a send command, such as SEND START. The send command initiates a process for transferring the identified page 270 (a "first page"), or a batch of identified VM pages 270. In one implementation, the send command causes the hypervisor 205 to perform the following operations:

(1) Cause the access modifier 210 of the hypervisor to protect the encrypted VM page 270 from VM access. This is also referred to as disabling VM access. Protecting the page 270 from VM access may include marking the page invalid in an extended page table (EPT) maintained by the source host machine 200. Furthermore, protecting the page 270 from VM access may include protecting the VM page 270 from read access, write access, execution access, and/or some combination of these access types. In one implementation, if a VM access is triggered after the VM access is disabled, this may cause an exit to the hypervisor. The VM access is then detected by the hypervisor and the hypervisor causes the VM execution to stop. VM execution may then be resumed after the "receive" command process (described below) is complete (or after VM access is restored/re-enabled (described below)).

(2) Cause the page encryptor/decryptor 220 to decrypt the encrypted VM page 270, in-place in the memory 250, using a guest-specific encryption key (may also be referred to as a VM-specific encryption key). In one implementation, "in-place in the memory 250" refers to modifying the contents of a memory page without copying or moving the contents to a different location (i.e., the original contents are changes to modified contents and the original contents are no longer accessible). The encryptor/decryptor 220 may then subsequently encrypt, in-place in the memory 250, the decrypted contents of the page 270 using a migration key. This in-place decrypt and encrypt is depicted with a "(1) In-Place Decrypt/Encrypt" in FIG. 2A and cause encrypted VM page 270 to be modified to migration VM page 280. The migration key is an encryption key that is generated using a cryptographic context that is established between the source host and the destination host. The migration key is different than the VM-specific encryption key utilized by the encrypted virtualization engine to encrypt the VM. In one implementation, the migration key is established by one or more of a source hypervisor, a destination hypervisor, and/or host controller. The migration key may be maintained in a hardware location (e.g., register) of the host machine for access by a CPU and/or encrypted virtualization engine.

(3) Cause the page allocator 230 to allocate a second page in a buffer maintained in hypervisor memory. The buffer is depicted as migration page buffer 260 in FIG. 2A.

(4) Cause the page copier 240 to copy contents of the migration VM page 280 to the second page in migration page buffer 260. This copying is depicted as "(2) Copy" in FIG. 2A.

In one implementation, the hypervisor 205 may execute a SEND_STOP command to cause the active page copying described above to terminate and/or to indicate an end of the active page copying process described above. The hypervisor 205 may then re-enable access to the encrypted VM page 270 for the VM by executing a receive command, such as RECEIVE_START.

In one implementation, the receive command causes the hypervisor 205 to perform the following operations:

(1) Cause the page encryptor/decryptor 220 to decrypt the migration VM page 280 in-place in the memory 250 using the migration key. The encryptor/decryptor 220 may then subsequently encrypt, in-place in the memory 250, the decrypted contents of the page 280 using the guest-specific encryption key. This in-place decrypt and encrypt is depicted with a "(3) In-Place Decrypt/Encrypt" in FIG. 2A and causes migration VM page 280 to be modified back to encrypted VM page 270. As a result, the original first page having content encrypted with the VM-specific encryption key remains in place, and a second copied page 280 having content encrypted with the migration key is also provided.

(2) Cause the access modifier 210 to restore VM access to the encrypted VM page 270, thus allowing the VM access to this page 270 during the migration process. Restoring VM access may also be referred to as re-enabling VM access. The access modifier 210 may restore VM access to the VM page 270 by marking the page 270 valid and read-only in the EPT. Restoring VM access may include restoring less rights than were there originally, provided to the VM (e.g., protecting removes read and write access, but restoring only read access).

In one implementation, the hypervisor 205 may execute a RECEIVE_STOP command to cause the access re-enablement described above to terminate and/or to indicate an end of the access re-enablement process described above. At this point, the migration page buffer 260 includes a copy of the VM memory page (or a batch of copies of VM memory pages) that are encrypted with the migration key and can be transmitted to the destination host machine. This transmission process is depicted as "(4) Migrate" in FIG. 2A. In addition, the memory 250 includes the original VM memory page, encrypted with the guest-specific encryption key, which is accessible by the VM during the migration.

Figure 2B:
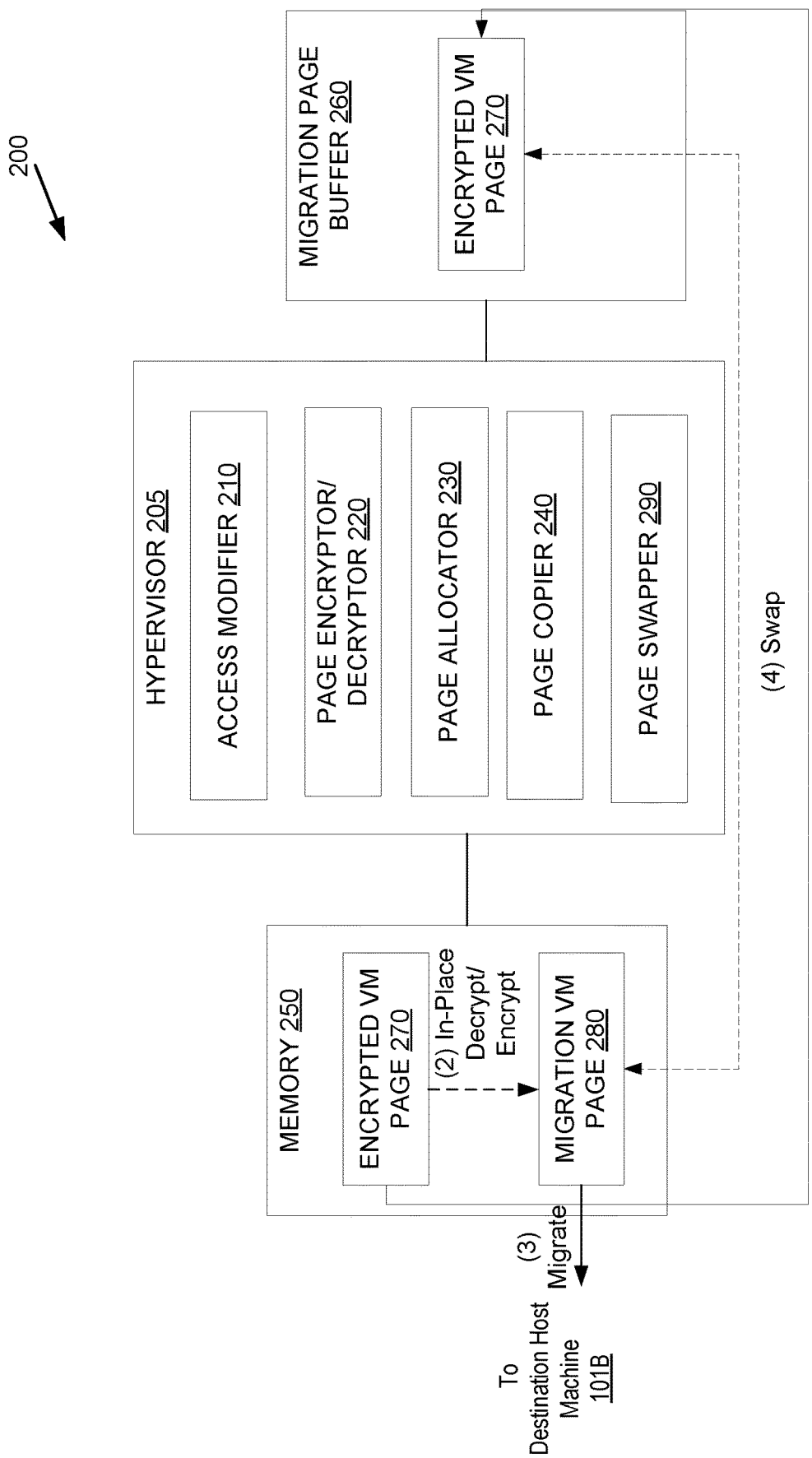
FIG. 2B schematically illustrates another example apparatus in which implementations of the disclosure may operate.

FIG. 2B is a block diagram of another iteration of the source host machine 200 of FIG. 2A. Source host machine 200 can provide active page copying for encrypted VMs during migration by using a swap command, in accordance with an implementation of the disclosure. Source host machine 200 may include similar components as described with respect to FIG. 2A, with various modifications discussed below.

The hypervisor 205 may perform a migration process using active page copying for an encrypted VM and a swap command. When an encrypted VM page 270 in memory 250 is identified for migration from the source host machine 200, the hypervisor 205 may cause the access modifier 210 of the hypervisor to protect the encrypted VM page 270 from VM access. Protecting the page 270 from VM access may include marking the page invalid in an EPT maintained by the source host machine 200. Furthermore, protecting the page 270 from VM access may include protecting the VM page 270 from read access, write access, execution access, and/or some combination of these access types.

The hypervisor 205 may then cause the page copier 240 to copy the encrypted VM page 270 to a migration page buffer 260 maintained in hypervisor memory. This copying is depicted as "(1) Copy" in FIG. 2B.

The hypervisor 205 may then cause the page encryptor/decryptor 220 to decrypt the encrypted VM page 270 in-place in the memory 250 using a guest-specific encryption key. The encryptor/decryptor 220 may then subsequently encrypt, in-place in the memory 250, the decrypted contents of the page 270 using a migration key. This in-place decrypt and encrypt is depicted with a "(2) In-Place Decrypt/Encrypt" in FIG. 2A and causes encrypted VM page 270 to be modified to migration VM page 280. At this point, the memory 250 includes a copy of the VM memory page 280 (or a batch of copies of VM memory pages) that are encrypted with the migration key and can be transmitted to the destination host machine. This transmission process is depicted as "(3) Migrate" in FIG. 2A.

In addition, the migration page buffer 260 includes the original VM memory page 270, encrypted with the guest-specific encryption key. After the migration VM page 280 is transmitted to the destination host machine, the hypervisor 205 causes a page swapper 290 to execute a page swap command to cause the encrypted VM page 270 in the migration page buffer 260 to be switched with the migration VM page 280 in the memory 250. This swap is depicted as "(4) Swap" in FIG. 2B. In one implementation, a swap space or paging space is an area of disk that is used for storage of memory that has been swapped out (paged out) of RAM. Memory 250 may be divided into chunks of memory called pages. Swapping may include a process where the contents of memory are moved to a preconfigured area of disk called a swap space. In one implementation, the kernel of an OS in the source host machine may swap out less-used pages to disk and free memory for processes that are requesting the memory immediately. For purposes of the implementations of the disclosure, the swapping process may be utilized to switch contents of the encrypted VM page 270 in buffer 260 with the migration VM page 280 in memory 250. Other processes for swapping performed by a CPU may be utilized in implementations of the disclosure.

Once the pages are swapped, the hypervisor 205 may cause the access modifier 210 to restore VM access to the encrypted VM page 270, thus allowing the VM access to this page 270 during the migration process. The write protector 210 may restore VM access to the VM page 270 by marking the page 270 valid and read-only in the EPT. Restoring (and/or re-enabling) VM access may include restoring less rights than were there originally, provided to the VM (e.g., protecting removes read and write access, but restoring restores only read access).

At this point, the migration page buffer 260 includes a copy of the VM memory page 280 (or a batch of copies of VM memory pages) that are encrypted with the migration key and the memory 250 includes the original VM memory page 270, encrypted with the guest-specific encryption key, which is accessible by the VM during the migration.

Referring back to FIG. 1, if a write fault is detected during the migration process, the source migration agent 120a may record the page address associated with the write fault and restore VM access to the page. At a later stage in the migration process, the page migration process described above that utilizes the active page copying via the hypervisor may be performed again for all of the pages that were detected as modified via the write fault.

When the destination migration agent 120b receives the memory pages of the VM 110a encrypted with the migration key, it can decrypt these pages with the migration key and utilize the encrypted virtualization engine 135b at destination host 101b to re-encrypt the memory pages with the VM-specific encryption key 137b. When the migration process has completed, destination source migration agent 120b and/or destination hypervisor 115b can then initiate the VM as destination VM 110b on destination host machine 101b.

In some implementations, the active page copying for encrypted VMs may be utilized in a non-live migration situation. For example, during a final stage of migration when execution of the VM is stopped to migrate the remaining pages of VM memory, the active page copying for encrypted VMs may be invoked to encrypt the remaining memory pages in place without having extra copies of the pages stored in memory. In addition, the active page copying for encrypted VMs may be utilized for memory deduplication technique. For example, the active page copying may be utilized as part of a kernel samepage merging (KSM) feature.

Figure 3:
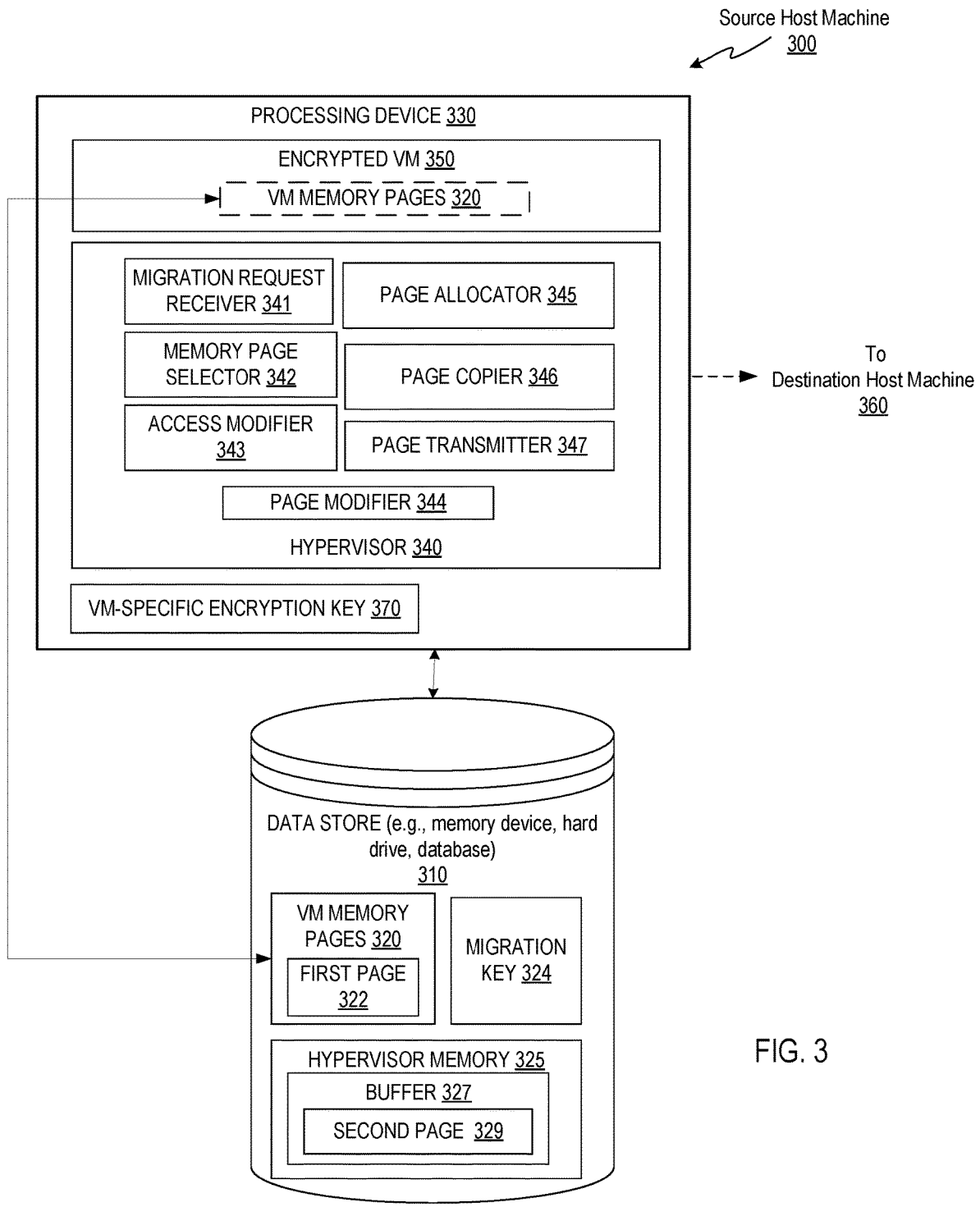
FIG. 3 is a block diagram of a hypervisor providing efficient migration for encrypted virtual machines by active page copying, in accordance with one or more aspects of the disclosure.

FIG. 3 illustrates an example source host machine 300 in which implementations of the disclosure may operate. Source host machine 300 may be the same or similar to the source host machine 101a within virtualization system 100 described with respect to FIG. 1. Source host machine 300 may include components and modules for efficient migration of encrypted VMs using active page copying. The source host machine 300 may include a data store 310 that can store VM memory pages 320, a migration key 324, and hypervisor memory 325. In one implementation, the VM memory pages 320 are memory (e.g., a page cache) of the source host machine 300 virtualized for use by encrypted VM 350. The hypervisor memory 325 may be a portion of memory assigned for use by a hypervisor 340. The data store 310 may include any non-persistent data storage (e.g., memory), persistent data storage (e.g., flash storage, hard drive, tape), other medium, or combination thereof that is capable of storing instructions for carrying out the operations of the components and modules discussed herein.

The source host machine 300 may include a processing device 330 with a hypervisor 340, an encrypted VM 350, and a VM-specific encryption key 370. The hypervisor 340 may implement active page copying for encrypted VM 350 during migration of the encrypted VM 350 from the source host machine 300 to a destination host machine 360. The hypervisor 340 may include a migration request receiver 341, a memory page selector 342, an access modifier 343, a page modifier 344, a page allocator 345, a page copier 346, and a page transmitter 347.

The migration request receiver 341 may receive a request to migrate the encrypted VM 350 to a destination host machine 360. The memory page selector 342 may identify a first page 322 of memory 320 of the encrypted VM 350 on the source host machine 300 for migration, where the first page 322 of memory is encrypted with a VM-specific encryption key 370. The access modifier 343 may protect the first page 322 from VM access. The page modifier 344 may modify the first page 322 from encrypted with the guest-specific encryption key 370 to encrypted with a migration key 324 while the first page 322 remains in place in memory 320 of the source host machine 300.

The page allocator 345 may allocate a second page 329 in a buffer 327 maintained in hypervisor memory 325 of the hypervisor 340 managing the VM 350. The page copier 346 may copy content of the first page 322 to the second page 329. The page modifier 346 may, subsequent to copying the contents, modify the first page 322 from encrypted with the migration key 324 to encrypted with the guest-specific encryption key 370 while the first page 322 remains in place in memory 320 of the source host machine 300. The page transmitter 347 may transmit contents of the second page 329 to the destination host machine 360.

Figure 4:
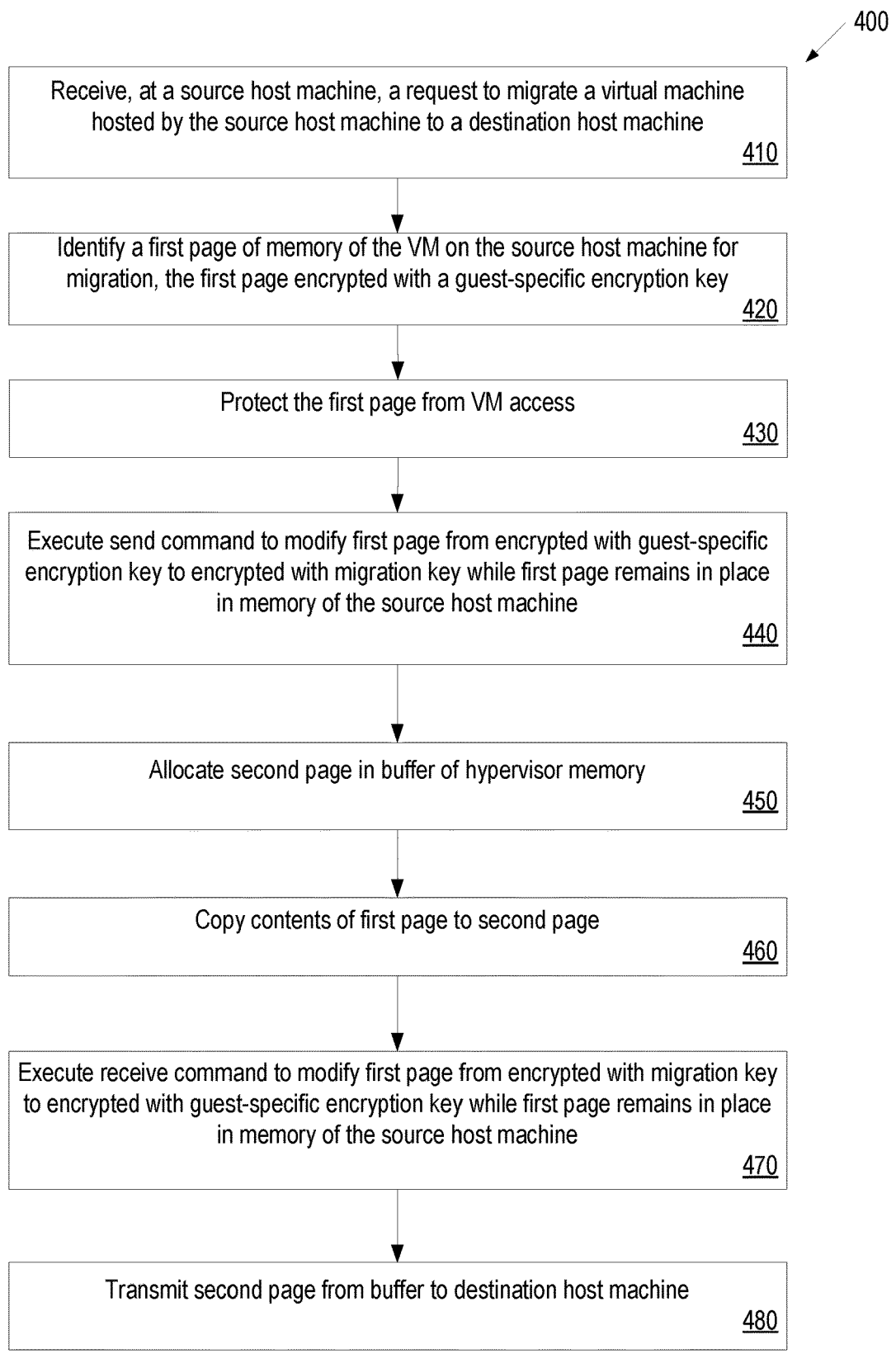
FIG. 4 depicts a flow diagram of a method of efficient migration for encrypted virtual machines by active page copying using send and receive commands, in accordance with one or more aspects of the disclosure.
Figure 5:
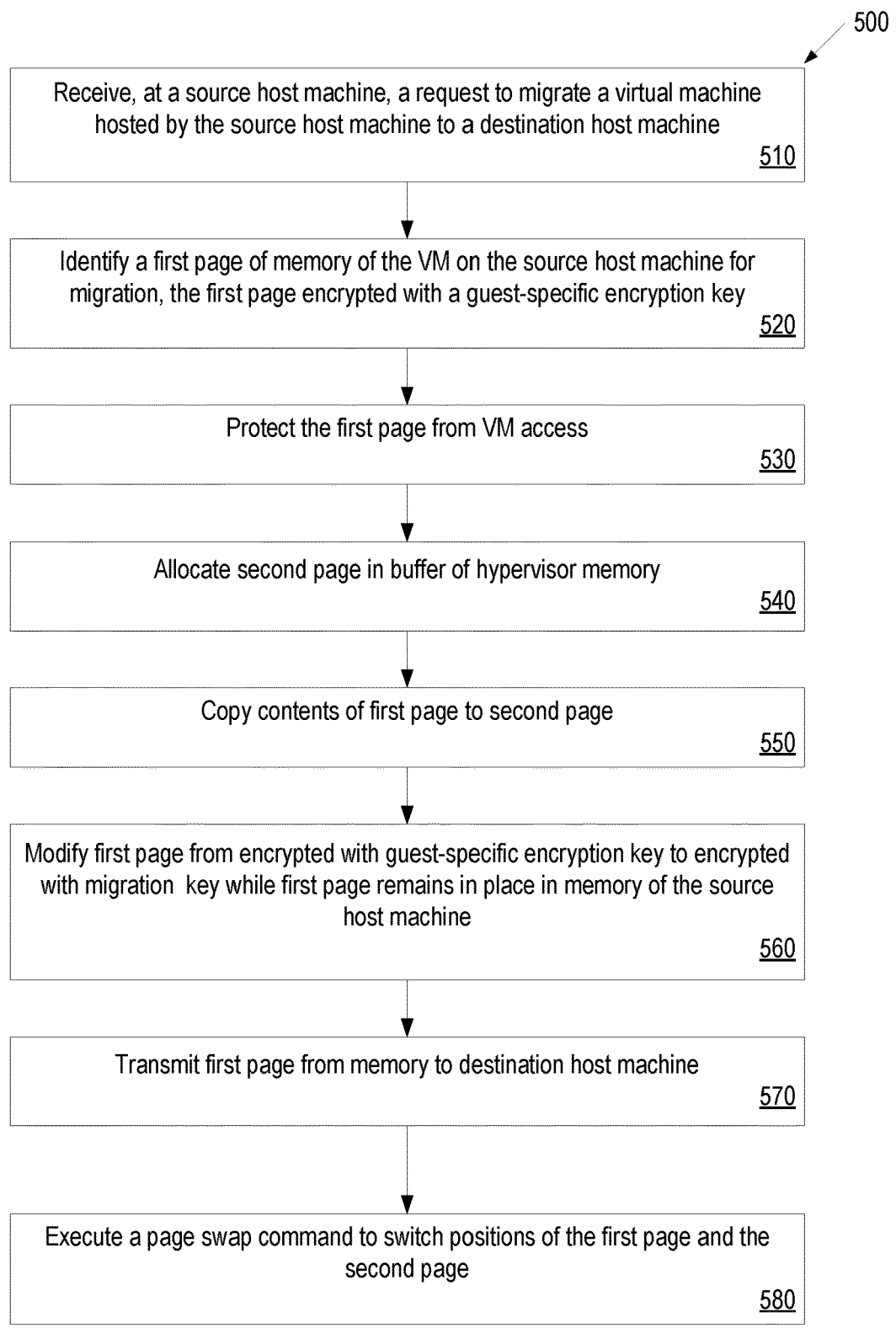
FIG. 5 depicts a flow diagram of a method of efficient migration for encrypted virtual machines by active page copying using a swap command, in accordance with one or more aspects of the disclosure.

FIGS. 4 and 5 depict flow diagrams for illustrative examples of methods 400 and 500 for efficient migration of encrypted VMs using active page copying. Method 400 includes a method of active page copying for encrypted VMs using send and receive commands. Method 500 includes a method of active page copying for encrypted VMs using a swap command. Methods 400 and 500 may be performed by processing devices that may comprise hardware (e.g., circuitry, dedicated logic), computer readable instructions (e.g., run on a general purpose computer system or a dedicated machine), or a combination of both. Methods 400 and 500 and each of their individual functions, routines, subroutines, or operations may be performed by one or more processors of the computer device executing the method. In certain implementations, methods 400, and 500 may each be performed by a single processing thread. Alternatively, methods 400 and 500 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 4, method 400 may be performed by at least one of the hypervisor 205, as shown in FIG. 2A. Method 400 may begin at block 410, where a processing device of a source host machine may receive a request to migrate a VM hosted by the source host machine to a destination host machine. At block 420, the processing device may identify a first page of memory of the VM on the source host machine for migration, where the first page of memory encrypted with a VM-specific encryption key. Then, at block 430, the processing device may protect the first page from VM access.

Subsequently, at block 440, the processing device may execute a send command to modify the first page from encrypted with the guest-specific encryption key to encrypted with a migration key while the first page remains in place in memory of the source host machine. At block 450, the processing device may allocate a second page in a buffer maintained in hypervisor memory of a hypervisor managing the VM. Then, at block 460, the processing device may copy contents of the first page to the second page. At block 470, the processing device may execute a receive command to modify the first page from encrypted with the migration key to encrypted with the guest-specific encryption key while the first page remains in place in memory of the source host machine. Lastly, at block 480, the processing device may transmit contents of the second page to the destination host machine.

Referring to FIG. 5, method 500 may be performed by the hypervisor 205, as shown in FIG. 2B. Method 500 may begin at block 510, where a processing device of a source host machine may receive a request to migrate a VM hosted by the source host machine to a destination host machine. At block 520, the processing device may identify a first page of memory of the VM on the source host machine for migration, where the first page of memory encrypted with a VM-specific encryption key. At block 530, the processing device may protect the first page from VM access.

Subsequently, at block 540, the processing device may allocate a second page in a buffer maintained in hypervisor memory. Then, at block 550, the processing device may copy contents of the first page to the second page. At block 560, the processing device may modify the first page from encrypted with the guest-specific encryption key to encrypted with a migration key while the first page remains in place in memory of the source host machine. At block 570, the processing device may, subsequent to modifying the first page, transmit contents of the first page to the destination host machine. Lastly, at block 580, the processing device may subsequent to transmitting the contents of the first page, executing a swap command to switch positions of the first page and the second page.

Figure 6:
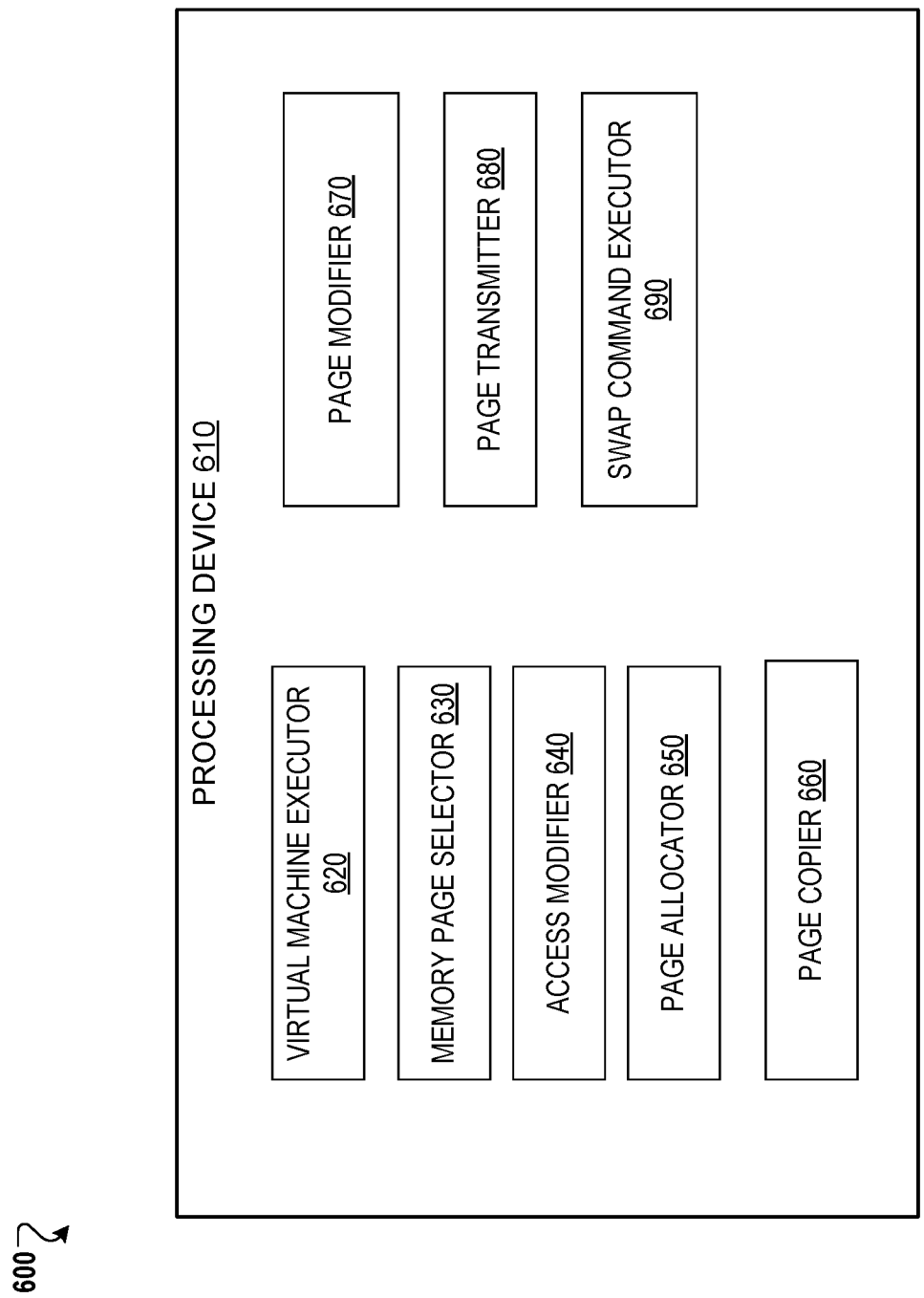
FIG. 6 is a block diagram of a processing device providing efficient migration for encrypted virtual machines by active page copying using send and receive commands, in accordance with one or more aspects of the disclosure.

FIG. 6 is a block diagram of an apparatus 600 providing efficient migration for encrypted virtual machines by active page copying a swap command, in accordance with one or more aspects of the disclosure. Apparatus 600 may be the same or similar to the source host machine 101a within virtualization system 100 described with respect to FIG. 1. Apparatus 600 may include components and modules for efficient migration of encrypted VMs using active page copying with a swap command. Apparatus 600 may include a processing device 610 to process various received data and may execute the code or instructions of one or more computer programs, for example, to provide input/output operations specified by the instructions. In one implementation, processing device 610 executes a hypervisor to perform active page copying with a swap command as part of a migration process of an encrypted VM.

Processing device 610 may include hardware circuitry to provide components including, but not limited to, a VM executor 620, a memory page selector 630, an access modifier 640, a page allocator 650, a page copier 650, a page modifier 670, a page transmitter 680, and a swap command executor 690. The VM executor 620 may execute a VM on the apparatus 600. The memory page selector 630 may identify a first page of memory of the VM for migration to a destination host machine, where the first page of memory encrypted with a VM-specific encryption key. The access modifier 640 may protect the first page from VM access. The page allocator 650 may allocate a second page in a buffer maintained in hypervisor memory.

The page copier 660 may copy contents of the first page to the second page. The page modifier 670 may modify the first page from encrypted with the guest-specific encryption key to encrypted with a migration key while the first page remains in place in memory of the apparatus. The page transmitter 680 may, subsequent to modifying the first page, transmit contents of the first page to the destination host machine. The swap command executor 690 may, subsequent to transmitting the contents of the first page, execute a swap command to switch positions of the first page and the second page.

Figure 7:
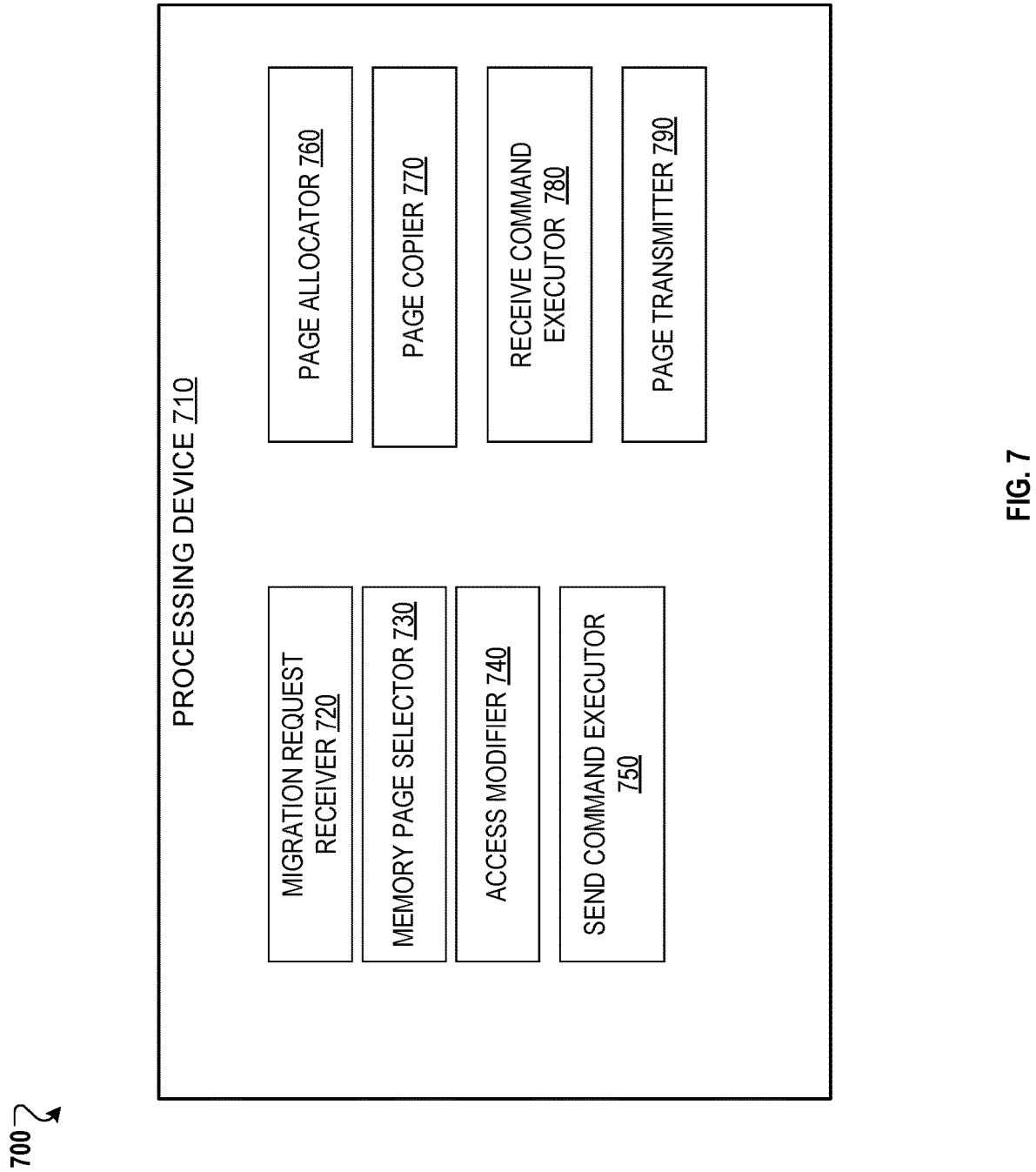
FIG. 7 is a block diagram of a processing device providing efficient migration for encrypted virtual machines by active page copying using a swap command, in accordance with one or more aspects of the disclosure.

FIG. 7 is a block diagram of an apparatus 700 providing efficient migration for encrypted virtual machines by active page copying using send and receive commands, in accordance with one or more aspects of the disclosure. Apparatus 700 may be the same or similar to the source host machine 101a within virtualization system 100 described with respect to FIG. 1. Apparatus 700 may include components and modules for efficient migration of encrypted VMs using active page copying with send and receive commands. Apparatus 700 may include a processing device 710 to process various received data and may execute the code or instructions of one or more computer programs, for example, to provide input/output operations specified by the instructions. In one implementation, processing device 710 executes a hypervisor to perform active page copying with send and receive commands as part of a migration process of an encrypted VM.

Processing device 710 may include hardware circuitry to provide components including, but not limited to, a migration request receiver 720, a memory page selector 730, an access modifier 740, a send command executor 750, a page allocator 760, a page copier 770, a receive command executor 780, and a page transmitter 790. The migration request received 720 may receive a request to migrate a VM to a destination host machine. The memory page selector 730 may identify a first page of memory of the VM on the source host machine for migration, where the first page of memory encrypted with a VM-specific encryption key. The access modifier 740 may protect the first page from VM access.

The send command executor 750 may execute a send command to modify the first page from encrypted with the guest-specific encryption key to encrypted with a migration key while the first page remains in place in memory of the source host machine. The page allocator 760 may allocate a second page in a buffer maintained in hypervisor memory. The page copier 770 may copy contents of the first page to the second page. The receive command executor 780 may execute a receive command to modify the first page from encrypted with the migration key to encrypted with the guest-specific encryption key while the first page remains in place in memory of the source host machine. The page transmitter 790 may transmit contents of the second page to the destination host machine.

Figure 8:
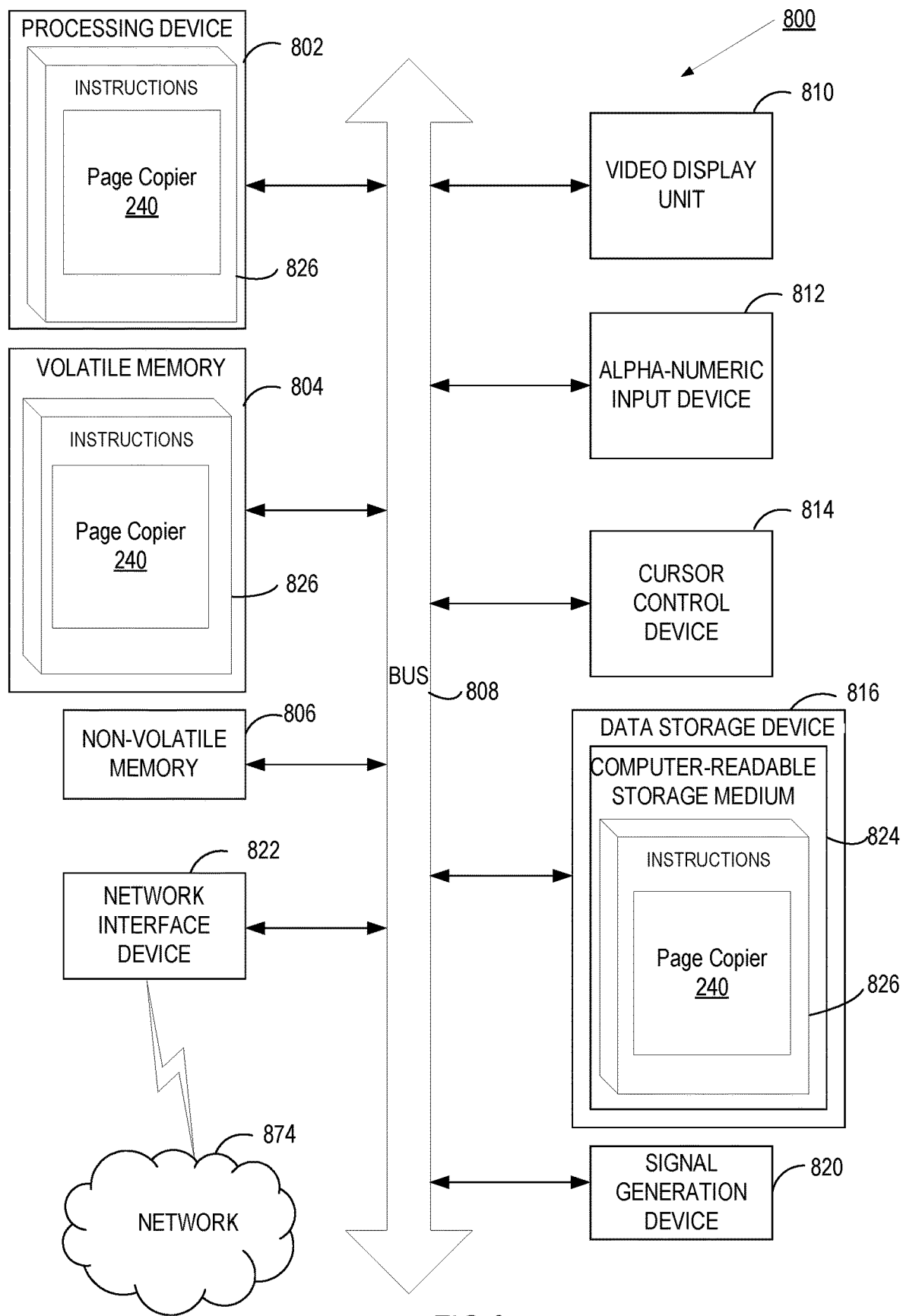
FIG. 8 depicts a block diagram of an illustrative computing device operating in accordance with the examples of the disclosure.

FIG. 8 depicts a block diagram of a computer system operating in accordance with one or more aspects of the disclosure. In various illustrative examples, computer system 800 may correspond to a computing device, such as computer system 100 of FIG. 1. The computer system may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alphanumeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions for a page copier 240 of FIGS. 2A and 2B for implementing methods 400 and/or 500 of FIGS. 4 and 5.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The following examples pertain to further embodiments. Example 1 is a method for efficient migration for encrypted VMs comprising receiving, by a source host machine hosting a virtual machine (VM), a request to migrate the VM to a destination host machine; identifying a first page of memory of the VM on the source host machine for migration, the first page of memory encrypted with a VM-specific encryption key; and protecting the first page from access by the VM. Further to Example 1, the method additionally comprises executing a send command to modify the first page from encrypted with the guest-specific encryption key to encrypted with a migration key while the first page remains in place in the memory of the source host machine, allocating a second page in a buffer maintained in hypervisor memory of a hypervisor managing the VM, copying contents of the first page to the second page, executing a receive command to modify the first page from encrypted with the migration key to encrypted with the guest-specific encryption key while the first page remains in place in the memory of the source host machine, and transmitting contents of the second page to the destination host machine.

In Example 2, the subject matter of Example 1 can optionally include wherein the first page is protected from access by the VM via an extended page table (EPT) maintained by the source host machine. In Example 3, the subject matter of any one of Examples 1-2 can optionally include wherein executing the send command further comprises decrypting the first page with the guest-specific encryption key; and encrypting the decrypted first page with the migration key. In Example 4, the subject matter of any one of Examples 1-3 can optionally include wherein executing the receive command further comprises decrypting the first page with the migration key, and encrypting the decrypted first page with the guest-specific encryption key.

In Example 5, the subject matter of any one of Examples 1-4 can optionally include subsequent to executing the receive command, restoring access by the VM to the first page so that the first page is accessible by the VM during migration of the VM. In Example 6, the subject matter of any one of Examples 1-5 can optionally include wherein the VM-specific encryption key is generated and maintained by an encryption engine of the source host machine. In Example 7, the subject matter of any one of Examples 1-6 can optionally include wherein the migration key comprises an encryption key generated using a cryptographic context that is established with the destination host machine, and wherein the migration key is different than the VM-specific encryption key.

In Example 8, the subject matter of any one of Examples 1-7 can optionally include wherein the hypervisor executes a migration agent to perform a migration process to migrate the VM. All optional features of the apparatus described above may also be implemented with respect to the method or process described herein.

Example 9 is a a non-transitory computer-readable medium for implementing efficient migration for encrypted VMs. In Example 9, the non-transitory machine-readable medium includes data that, when accessed by a processing device, cause the processing device to perform operations comprising receive, by a source host machine hosting a virtual machine (VM), a request to migrate the VM to a destination host machine, identify a first page of memory of the VM on the source host machine for migration, the first page of memory encrypted with a VM-specific encryption key, protect the first page from access by the VM, allocate a second page in a buffer maintained in hypervisor memory, copying contents of the first page to the second page, modify the first page from encrypted with the guest-specific encryption key to encrypted with a migration key while the first page remains in place in the memory of the source host machine, subsequent to modifying the first page, transmit contents of the first page to the destination host machine, and subsequent to transmitting the contents of the first page, executing a swap command to switch positions of the first page and the second page.

In Example 10, the subject matter of Example 9 can optionally include wherein the first page is protected from access by the VM via an extended page table (EPT) maintained by the source host machine. In Example 11, the subject matter of Example 9-10 can optionally include wherein the processing device to modify the first page further comprises the processing device to decrypt the first page with the guest-specific encryption key, and encrypt the decrypted first page with the migration key. In Example 12, the subject matter of any one of Examples 9-11 can optionally include wherein the processing device is further to, subsequent to executing the swap command, restore access by the VM to the first page so that the first page is accessible by the VM during migration of the VM.

In Example 13, the subject matter of any one of Examples 9-12 can optionally include wherein the VM-specific encryption key is generated and maintained by an encryption engine of the source host machine. In Example 14, the subject matter of any one of Examples 9-13 can optionally include wherein the migration key comprises an encryption key generated using a cryptographic context that is established with the destination host machine, and wherein the migration key is different than the VM-specific encryption key.

Example 15 is a source host machine for implementing efficient migration for encrypted VMs. In Example 15, the source host machine includes a memory to store virtual machine (VM) memory and hypervisor memory and a processing device operatively coupled to the memory. Further to Example 15, the processing device can receive, by a source host machine hosting a VM, a request to migrate the VM to a destination host machine, identify a first page of memory of the VM in the VM memory for migration, the first page of memory encrypted with a VM-specific encryption key, protect the first page from access by the VM, modify the first page from encrypted with the guest-specific encryption key to encrypted with a migration key while the first page remains in place in the memory of the source host machine, allocate a second page in a buffer maintained in the hypervisor memory of a hypervisor managing the VM, copy contents of the first page to the second page, subsequent to copying the contents, modify the first page from encrypted with the migration key to encrypted with the guest-specific encryption key while the first page remains in place in the memory of the source host machine, and transmit contents of the second page to the destination host machine.

In Example 16, the subject matter of Example 15 can optionally include wherein the first page is protected from access by the VM via an extended page table (EPT) maintained by the source host machine. In Example 17, the subject matter of any one of Examples 15-16 can optionally include wherein the processing device to modify the first page from encrypted with the guest-specific encryption key to encrypted with the migration key further comprises executing a send command.

In Example 18, the subject matter of any one of Examples 15-17 can optionally include where the send command to cause to the processing device to decrypt the first page with the guest-specific encryption key, and encrypt the decrypted first page with the migration key. In Example 19, the subject matter of any one of Examples 15-18 can optionally include wherein the processing device to modify the first page from encrypted with the migration key to encrypted with the guest-specific encryption key further comprises executing a receive command. In Example 20, the subject matter of any one of Examples 15-19 can optionally include wherein the receive command to cause the processing device to decrypt the first page with the migration key, and encrypt the decrypted first page with the guest-specific encryption key.

In Example 21, the subject matter of any one of Examples 15-20 can optionally include wherein the processing device is further to, subsequent to modifying the first page from encrypted with the migration key to encrypted with the guest-specific encryption key, restore access by the VM to the first page so that the first page is accessible by the VM during migration of the VM. In Example 22, the subject matter of any one of Examples 15-21 can optionally include wherein the VM-specific encryption key is generated and maintained by an encryption engine of the source host machine.

In Example 23, the subject matter of any one of Examples 15-22 can optionally include wherein the migration key comprises an encryption key generated using a cryptographic context that is established with the destination host machine, and wherein the migration key is different than the VM-specific encryption key. In Example 24, the subject matter of any one of Examples 15-23 can optionally include wherein the hypervisor to execute a migration agent to perform a migration process to migrate the VM. All optional features of the system described above may also be implemented with respect to the method or process described herein.

Example 25 is an apparatus for implementing efficient migration for encrypted VMs. In Example 25, the apparatus further comprises a processing device to execute a virtual machine (VM), identify a first page of memory of the VM for migration to a destination host machine, the first page of memory encrypted with a VM-specific encryption key, protect the first page from access by the VM, allocate a second page in a buffer maintained in hypervisor memory, copy contents of the first page to the second page, modify the first page from encrypted with the guest-specific encryption key to encrypted with a migration key while the first page remains in place in the memory of the apparatus, subsequent to modifying the first page, transmit contents of the first page to the destination host machine, and subsequent to transmitting the contents of the first page, execute a swap command to switch positions of the first page and the second page.

In Example 26, the subject matter of Example 25 can optionally include wherein the first page is protected from access by the VM via an extended page table (EPT). In Example 27, the subject matter of Examples 25-26 can optionally include wherein the processing device to modify the first page further comprises the processing device to decrypt the first page with the guest-specific encryption key, and encrypt the decrypted first page with the migration key.

In Example 28, the subject matter of Examples 25-27 can optionally include wherein the processing device is further to, subsequent to executing the swap command, restore access by the VM to the first page so that the first page is accessible by the VM during migration of the VM. In Example 29, the subject matter of Examples 25-28 can optionally include wherein the VM-specific encryption key is generated and maintained by an encryption engine. In Example 30, the subject matter of Examples 25-29 can optionally include wherein the migration key comprises an encryption key generated using a cryptographic context that is established with the destination host machine, and wherein the migration key is different than the VM-specific encryption key. In Example 31, the subject matter of Examples 25-30 can optionally include wherein the processing device to identify the first page of memory is in response to the processing device receiving a request to migrate the VM to the destination host machine.

Example 32 is an apparatus for implementing efficient migration for encrypted VMs. In Example 32, the apparatus further comprises means for receiving, at a source host machine hosting a virtual machine (VM), a request to migrate the VM to a destination host machine, means for identifying a first page of memory of the VM on the source host machine for migration, the first page of memory encrypted with a VM-specific encryption key, means for protecting the first page from access by the VM, means for executing a send command to modify the first page from encrypted with the guest-specific encryption key to encrypted with a migration key while the first page remains in place in the memory of the source host machine, means for allocating a second page in a buffer maintained in hypervisor memory, means for copying contents of the first page to the second page, means for executing a receive command to modify the first page from encrypted with the migration key to encrypted with the guest-specific encryption key while the first page remains in place in the memory of the source host machine; and means for transmitting contents of the second page to the destination host machine.

In Example 33, the subject matter of Example 32 can optionally include wherein the first page is protected from access by the VM via an extended page table (EPT) maintained by the source host machine. In Example 34, the subject matter of Examples 32-33 can optionally include wherein the means for executing the send command further comprises means for decrypting the first page with the guest-specific encryption key, and means for encrypting the decrypted first page with the migration key.

In Example 35, the subject matter of Examples 32-34 can optionally include wherein the means for executing the receive command further comprises means for decrypting the first page with the migration key, and means for encrypting the decrypted first page with the guest-specific encryption key. In Example 36, the subject matter of Examples 32-35 can optionally include further comprising means for restoring, subsequent to executing the receive command, access to the first page so that the first page is accessible by the VM during migration of the VM. In Example 37, the subject matter of Examples 32-36 can optionally include wherein the VM-specific encryption key is generated and maintained by an encryption engine of the source host machine. In Example 38, the subject matter of Examples 32-37 can optionally include wherein the migration key comprises an encryption key generated using a cryptographic context that is established with the destination host machine, and wherein the migration key is different than the VM-specific encryption key. Specifics in the Examples may be used anywhere in one or more embodiments.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "invoking," "associating," "providing," "storing," "performing," "utilizing," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 and 500 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:
    receiving, by a source host machine hosting a virtual machine (VM), a request to migrate the VM to a destination host machine;
    identifying a first page of memory of the VM on the source host machine for migration, the first page of memory encrypted with a guest-specific encryption key;
    preventing the VM from accessing the first page;
    executing, by the source host machine, a send command to modify the first page from encrypted with the guest-specific encryption key to encrypted with a migration key while the first page remains in place in the memory of the source host machine;
    allocating a second page in a buffer maintained in hypervisor memory of a hypervisor managing the VM;
    copying contents of the first page to the second page;
    executing, by the source host machine, a receive command to modify the first page from encrypted with the migration key to encrypted with the guest-specific encryption key while the first page remains in place in the memory of the source host machine and to restore the access by the VM to the first page;
    restoring, subsequent to executing the receive command, access by the VM to the first page so that the first page is accessible by the VM at the source host machine during migration of the VM; and
    transmitting contents of the second page to the destination host machine.

2. The method of claim 1, wherein the first page is protected from access by the VM via an extended page table (EPT) maintained by the source host machine.

3. The method of claim 1, wherein executing the send command further comprises:
    decrypting the first page with the guest-specific encryption key; and
    encrypting the decrypted first page with the migration key.

4. The method of claim 1, wherein executing the receive command further comprises:
    decrypting the first page with the migration key; and
    encrypting the decrypted first page with the guest-specific encryption key.

5. The method of claim 1, wherein the VM-specific encryption key is generated and maintained by an encryption engine of the source host machine.

6. The method of claim 5, wherein the migration key comprises an encryption key generated using a cryptographic context that is established with the destination host machine, and wherein the migration key is different than the VM-specific encryption key.

7. The method of claim 1, wherein the hypervisor executes a migration agent to perform a migration process to migrate the VM.

8. A non-transitory machine-readable storage medium storing instructions that cause a processing device to:
    receive, by a source host machine hosting a virtual machine (VM), a request to migrate the VM to a destination host machine;
    identify a first page of memory of the VM on the source host machine for migration, the first page of memory encrypted with a guest-specific encryption key;
    prevent the VM from accessing the first page;
    allocate a second page in a buffer maintained in hypervisor memory;

copying contents of the first page to the second page;
modify, by the source host machine, the first page from encrypted with the guest-specific encryption key to encrypted with a migration key while the first page remains in place in the memory of the source host machine;
subsequent to modifying the first page, transmit contents of the first page to the destination host machine;
subsequent to transmitting the contents of the first page, executing, by the source host machine, a swap command to switch the contents of the first page and contents of the second page; and
subsequent to execution of the swap command, restore the access by the VM to the first page so that the first page is accessible by the VM at the source host machine during migration of the VM.

9. The non-transitory machine-readable storage medium of claim 8, wherein the first page is protected from access by the VM via an extended page table (EPT) maintained by the source host machine.

10. The non-transitory machine-readable storage medium of claim 8, wherein the processing device to modify the first page further comprises the processing device to:
decrypt the first page with the guest-specific encryption key; and
encrypt the decrypted first page with the migration key.

11. The non-transitory machine-readable storage medium of claim 8, wherein the VM-specific encryption key is generated and maintained by an encryption engine of the source host machine, and wherein the migration key comprises an encryption key generated using a cryptographic context that is established with the destination host machine, and wherein the migration key is different than the VM-specific encryption key.

12. A source host machine, comprising,
a memory to store virtual machine (VM) memory and hypervisor memory; and
a processing device operatively coupled to the memory, the processing device to:
receive a request to migrate the VM to a destination host machine;
identify a first page of memory of the VM in the VM memory for migration, the first page of memory encrypted with a guest-specific encryption key;
prevent the VM from accessing the first page;
modify the first page from encrypted with the guest-specific encryption key to encrypted with a migration key while the first page remains in place in the memory of the source host machine;
allocate a second page in a buffer maintained in the hypervisor memory of a hypervisor managing the VM;
copy contents of the first page to the second page;
subsequent to copying the contents, modify the first page from encrypted with the migration key to encrypted with the guest-specific encryption key while the first page remains in place in the memory of the source host machine;
subsequent to modifying the first page from encrypted with the migration key to encrypted with the guest-specific encryption key, restore the access by the VM to the first page so that the first page is accessible by the VM at the source host machine during migration of the VM; and
transmit contents of the second page to the destination host machine.

13. The source host machine of claim 12, wherein the first page is protected from access by the VM via an extended page table (EPT) maintained by the source host machine.

14. The source host machine of claim 12, wherein the processing device to modify the first page from encrypted with the guest-specific encryption key to encrypted with the migration key further comprises executing a send command.

15. The source host machine of claim 14, wherein the send command to cause to the processing device to:
decrypt the first page with the guest-specific encryption key; and
encrypt the decrypted first page with the migration key.

16. The source host machine of claim 12, wherein the processing device to modify the first page from encrypted with the migration key to encrypted with the guest-specific encryption key further comprises executing a receive command.

17. The source host machine of claim 16, wherein the receive command to cause the processing device to:
decrypt the first page with the migration key; and
encrypt the decrypted first page with the guest-specific encryption key.

18. The non-transitory machine-readable storage medium of claim 8, wherein the VM-specific encryption key is generated and maintained by an encryption engine of the source host machine.

19. The source host machine of claim 12, wherein the VM-specific encryption key is generated and maintained by an encryption engine of the source host machine.

* * * * *